L. C. NELSON AND J. C. POLAN.
AUTOMOBILE CURTAIN WINDOW.
APPLICATION FILED OCT. 23, 1920.
1,386,793. Patented Aug. 9, 1921.
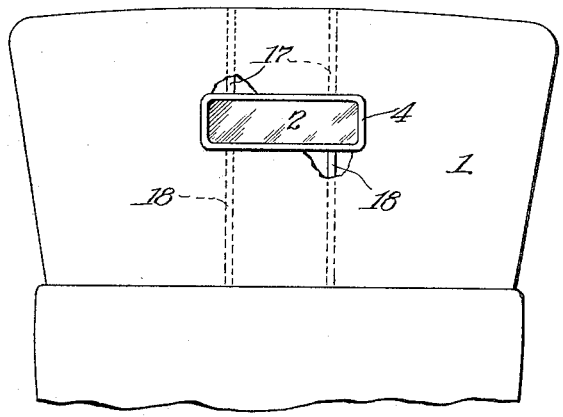
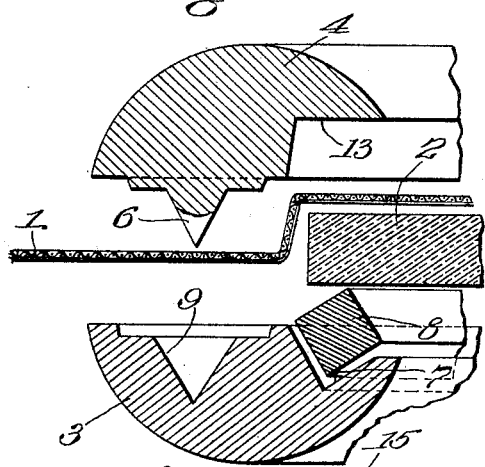
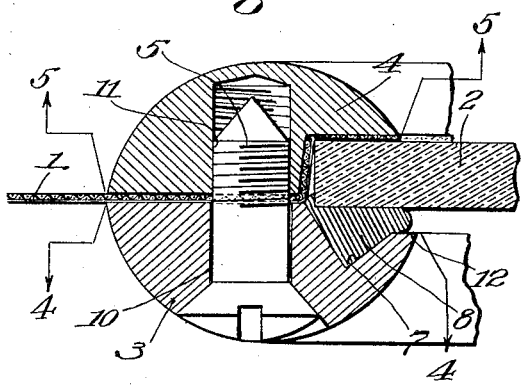
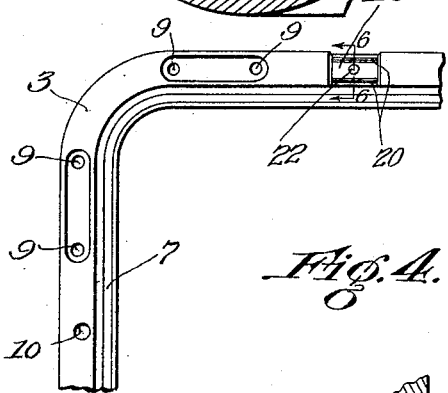
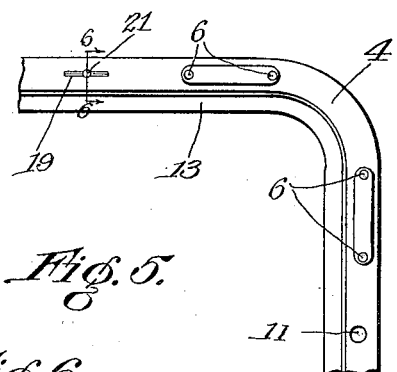
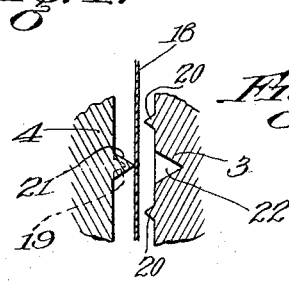
WITNESS:
P. F. Gathmann
INVENTORS:
Lawrence C. Nelson, and
BY Joseph C. Polan.
THEIR ATTORNEYS:

UNITED STATES PATENT OFFICE.

LAWRENCE C. NELSON, OF DETROIT, MICHIGAN, AND JOSEPH C. POLAN, OF BERWYN, ILLINOIS, ASSIGNORS TO McAVOY MANUFACTURING COMPANY, OF CHICAGO, ILLINOIS, A CORPORATION OF ILLINOIS.

AUTOMOBILE-CURTAIN WINDOW.

1,386,793.  Specification of Letters Patent.  Patented Aug. 9, 1921.

Application filed October 23, 1920. Serial No. 418,921.

*To all whom it may concern:*

Be it known that we, LAWRENCE C. NELSON and JOSEPH C. POLAN, both United States citizens, the former residing at Detroit, in the county of Wayne and the State of Michigan, and the latter residing in the town of Berwyn, in the county of Cook and the State of Illinois, have invented certain new and useful Improvements in Automobile-Curtain Windows, of which the following is a specification, reference being had to the accompanying drawings, forming a part thereof.

The purpose of this invention is to provide an automobile window curtain with an improved frame construction which shall be water-tight and which can be assembled quickly and easily and without imposing any undue strain upon the parts. It consists of the elements and features of construction described and shown in the drawings as indicated by the claims.

In the drawings:—

Figure 1 is an outside view of an automobile curtain equipped with a window embodying this invention.

Fig. 2 is a transverse sectional view of the frame parts on an enlarged scale showing also fragmental portions of the curtain and window glass in position preparatory to assembling.

Fig. 3 is also an enlarged transverse section showing the parts assembled, the view being taken through one of the screws connecting the frame parts.

Fig. 4 is a detail section taken as indicated at line 4—4 on Fig. 3.

Fig. 5 is a detail section taken as indicated at line 5—5 on Fig. 3 and showing a portion of the frame adapted to mate with that shown in Fig. 4.

Fig. 6 is a detail section indicating the method of securing the stay-straps and being taken as indicated at lines 6—6 on Figs. 4 and 5.

As shown in Fig. 1 the curtain of the usual fabric or leather is indicated at 1 and a glass window, 2, is shown mounted therein by means of a two part frame composed of mated parts, 3 and 4, which are of similar outline, but adapted to be secured against opposite faces respectively of the curtain, 1. In the drawing the frame part, 4, is shown as secured against the outer face of the curtain, 1, but a reversed arrangement in which the part, 3, might be on the outside and the part, 4, on the inside of the curtain would still be within the scope of this invention. The parts, 3 and 4, as shown in Fig. 3 are held together by means of screws, 5, which may be understood as disposed at fairly frequent intervals around the frame.

For manufacturing convenience the frame parts, 3 and 4, are preferably die cast and in some instances are very slightly warped in cooling. It is also found in practice that the glass, 2, unless selected with extreme care, varies somewhat in thickness. As a result of this irregularity it becomes difficult to clamp the glass, 2, securely between the frame members, 3 and 4, without frequently imposing such uneven pressure upon it as to result in breakage either during the assembly or shortly after installation of the glass in the curtain.

To overcome this difficulty the frame member, 3, is formed with a continuous groove or channel, 7, adjacent its inner edge and a yielding gasket or cushion strip, 8, preferably of rubber, is lodged in this groove with a considerable portion of its cross-section extending above the rim of the groove to support the glass, 2. The yielding nature of the cushion strip, 8, permits drawing down the connecting screws, 5, so that the frame parts, 3 and 4, are firmly clamped together while the glass itself is subject to a yielding and more uniform pressure than it would be if directly engaged by the metallic frame. The cushion strip, 8, also holds the glass firmly enough to prevent rattling and where the frame member, 3, is on the outer side of the curtain, 1, the srip, 8, will serve as a water-tight packing.

In the preferred construction illustrated, the strip, 8, is of a square cross-section and the walls of the V-shaped groove, 7, form a right-angle to receive the strip. But the right-angle of the groove is not symmetrical with respect to the surface of the glass, 2; instead it is so disposed that the diagonal of the square strip, 8, if projected from the vertex of the groove, 7, toward the glass, 2, would lean away from the margin of the glass. As a result, when the frame parts are clamped together imposing a pressure upon the edge of the rubber strip, 8, the strip is unevenly distorted and most of the rubber is pressed toward the inner margin of the frame. 3, only a small part of the rubber being forced past the edge of the glass into the small clearance space there formed in the frame member, 4. This distribution of the packing strip, 8, is provided for by forming the inner margin, 12, of the frame member, 3 at a plane somewhat below the meeting plane of the frame members, leaving a clearance space between this margin and the surface of the glass, 2, into which the rubber may expand.

If the packing strip, 8, be initially glued or cemented into its groove, 7, so as to be handled as an integral part of the frame member, 3, the assembly of the curtain window becomes quite simple. Before any opening is cut in the curtain material, 1, the curtain is laid over the frame member, 4, the latter being placed with its pointed dowel pins, 6, projecting upward against the curtain, 1. The glass, 2, is then laid upon the curtain material in its proper relation to the frame member, 4, so as to press the curtain into the angular recess, 13, provided for the glass. The frame member, 3, is then applied over the curtain with its recess, 9, registering with the projecting dowels, 6, and with the gasket, 8, pressed against the surface of the glass, 2. Connecting screws, 5, being then inserted in holes, 10, of the member, 3, and engaged in the threaded holes, 11, of the member, 4, are turned down to draw the frame members together with the fabric, 1, interposed as shown in Fig. 3 and the dowels, 6, are thus caused either to penetrate the material or to force it deeply into the recess, 9, firmly securing it between the frame parts. The area of the fabric, 1, lying within the margin of the frame member, 4, is then cleanly cut away with a sharp knife.

The rubber strip, 8, will so distribute the pressure upon the glass that the material of the curtain, 1, which is lodged in the recess, 13, may be very firmly clamped therein so as to practically destroy its porosity and prevent it from absorbing moisture which may lodge on the surface of the glass adjacent the frame margin. However, if desired as an additional precaution, the portion of the curtain which is thus clamped in the recess, 13, may be treated with waterproofing material or the exposed edge of the fabric may be shellacked.

To relieve the fabric wall of strain from the weight of the glass, 2, and its mounting frame, it is frequently desirable to provide stay-straps, 17 and 18, located as suggested in Fig. 1 and extending to some more rigid element such as a bow of the top frame and the back of the automobile body as indicated. These stay-straps may be attached to the window frame at the time of assembly and without additional securing means if the frame to be formed as shown in Figs. 4, 5 and 6 with a small rib, 19, on the part, 4, positioned to intermember with small parallel ribs, 20, on the part, 3, for crimping the end of the strap. In addition a pointed dowel, 21, may be associated with the rib, 19, and a recess, 22, formed in the other member to receive it.

We claim:—

1. An automobile curtain window comprising a glass and a two-part frame, one of the frame parts having a groove angular in cross section opposite the marginal portion of the glass, and a gasket lodged therein conformed in cross-section to the groove at the side seated therein, and at the opposite side presenting surfaces converging to a line of seating on the glass, and means for drawing the two frame parts together with the glass interposed.

2. In the combination defined in claim 1, the groove having its walls at respectively different angles to the plane of the glass, the wall nearer the inner margin of the frame forming the smaller angle whereby the gasket when compressed is distorted mainly toward said inner margin of the frame and over the surface of the glass.

3. In the combination defined in claim 1, the groove having its walls at right-angles to each other and at respectively different angles to the plane of the glass, the wall nearer the inner margin of the frame forming the smaller angle and the gasket being of square cross-section fitted into the right-angle of the groove with its opposite edge compressed against the surface of the glass.

4. An automobile curtain window comprising a glass and a two-part frame with means for securing the two frame parts together with the curtain material interposed and clamped between them, the inner marginal portions of the frame being recessed to provide a seating space for the margin of the glass of greater width than the thickness of said glass, said frame being assembled with the curtain material extending to the inner margin thereof and with the glass seated on said material in the recessed portion of one frame member, the other frame member having a groove opposite the marginal portion of the glass with a compressible gasket of greater cross-section than the groove lodged therein and compressed against the surface of the glass when the frame parts are secured together.

In testimony whereof, we have hereunto set our hands at Chicago, Illinois, this 20th day of October, 1920.

LAWRENCE C. NELSON.
JOSEPH C. POLAN.